(12) United States Patent
Sasaoka

(10) Patent No.: US 8,805,146 B2
(45) Date of Patent: Aug. 12, 2014

(54) MULTICORE OPTICAL FIBER

(75) Inventor: Eisuke Sasaoka, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 477 days.

(21) Appl. No.: 13/009,874

(22) Filed: Jan. 20, 2011

(65) Prior Publication Data

US 2011/0206330 A1    Aug. 25, 2011

(30) Foreign Application Priority Data

Jan. 21, 2010    (JP) ................. P2010-011149

(51) Int. Cl.
*G02B 6/36*    (2006.01)

(52) U.S. Cl.
USPC ........................................ 385/126

(58) Field of Classification Search
USPC ........................................ 385/126
See application file for complete search history.

(56) References Cited

U.S. PATENT DOCUMENTS

| 5,689,578 A | 11/1997 | Yamauchi et al. | |
| 8,503,847 B2 * | 8/2013 | Kokubun et al. | 385/126 |

FOREIGN PATENT DOCUMENTS

| CN | 1455279 | 11/2003 |
| CN | 102171596 | 8/2011 |
| WO | WO 2010/038863 | 4/2010 |

OTHER PUBLICATIONS

Yasuo Kokubun et al., "Novel multi-core fibers for mode division multiplexing: proposal and design principle", IEICE Electronics Express, Apr. 25, 2009, vol. 6, No. 8, pp. 522-528.
Masanori Koshiba et al., "Heterogeneous multi-core fibers: proposal and design principle", IEICE Electronics Express, Jan. 25, 2009, vol. 6, No. 2, pp. 98-103.
Ryezard S. Romaniuk et al., Multicore optical fiber components, Proceedings of Spie, Sep. 22, 1986, vol. 722, pp. 117-124.
A. Nishimura et al., "Characterization of crosstalk of two-core single-mode bunch fiber", European Conference on Optical Communication (ECOC), Sep. 22, 1986, vol. 1, No. 1986, pp. 195-198.
Yasuo Kokubun et al., "Hetergeneous uncoupled and homogeneous coupled multicore fibers," BS-7-7, IEICE, Sep. 15-18, 2009, S-42-S-43, including partial English translation.

\* cited by examiner

*Primary Examiner* — Sarah Hahm
(74) *Attorney, Agent, or Firm* — Drinker Biddle & Reath LLP

(57) ABSTRACT

The present invention relates to a multicore optical fiber having a structure for effectively inhibiting polarization mode dispersion from increasing, and the multicore optical fiber comprises a plurality of multicore units and a cladding region integrally covering the plurality of multicore units while separating the multicore units from each other. Each of the plurality of multicore units includes a plurality of core regions arranged such as to construct a predetermined core arrangement structure on a cross section orthogonal to an axis. The core arrangement structure of each multicore unit on the cross section has such a rotational symmetry as to coincide with the unrotated core arrangement structure at least three times while rotating by 360° about a center of the multicore unit, thereby reducing the structural asymmetry of each multicore unit. This lowers the structural birefringence in each multicore unit, thereby inhibiting the polarization mode dispersion from increasing in the multicore optical fiber.

8 Claims, 6 Drawing Sheets

MULTICORE OPTICAL FIBER

BACKGROUND OF THE INVENTION

1. Field of the Invention

The present invention relates to a multicore optical fiber in which a plurality of core regions are arranged on the same cross section as a transmission medium for optical communications.

2. Related Background Art

As optical fiber networks have recently been increasing their traffic volume, attention has been focused on the use of multicore optical fibers (MCF) containing a number of cores within a cladding region. As an example of the multicore optical fibers, FIG. 7 of Y. KOKUBU and M. KOSHIBA, "Heterogeneous uncoupled and homogeneous coupled multicore fibers", BS-7-7, IEICE2009, Sep. 15-Sep. 18, 2009) (Document 1) illustrates a multicore optical fiber in which a coupled core group constituted by densely arranging a plurality of cores having the same refractive index and the same core diameter is separated from its adjacent coupled core group by an uncoupled distance which can prevent crosstalk from occurring therebetween.

SUMMARY OF THE INVENTION

The present inventors have examined the conventional multicore optical fibers, and as a result, have discovered the following problems.

Namely, the arrangement of each coupled core group (core arrangement structure) in the multicore optical fiber shown in FIG. 7 of the above-mentioned Document 1 has such a rotational symmetry as to coincide with the unrotated core arrangement structure when rotated by 180° about its center. That is, each core arrangement structure shown in FIG. 7 of the above-mentioned Document 1 has such a rotational symmetry that it coincides with the unrotated core arrangement structure twice while rotating by 360° about its center. On the other hand, the core arrangement structure of each coupled core group greatly varies between the longitudinal and traverse directions. Therefore, in such a conventional multicore fiber, a large structural birefringence may occur, thereby increasing polarization mode dispersion (PMD). Since the polarization mode dispersion is one of factors restricting the bit rate and transmission distance in optical fiber communications, the increase in polarization mode dispersion may become a large problem when employing a multicore optical fiber in high-capacity, long-distance optical transmissions.

The present invention has been developed to eliminate the problems described above. It is an object of the present invention to provide a multicore optical fiber having a structure for effectively inhibiting polarization mode dispersion from increasing.

The multicore optical fiber according to the present invention comprises a plurality of multicore units each extending along an axis, and a cladding region covering the plurality of multicore units while separating the multicore units from each other. Each multicore unit has a plurality of core regions arranged such as to construct a predetermined core arrangement structure on a cross section of the multicore optical fiber orthogonal to the axis. In particular, the core arrangement structure of each multicore unit has such a rotational symmetry as to coincide with the unrotated core arrangement structure at least three times while rotating by 360° about a center of the multicore unit on the cross section. In the specification, the "unrotated core arrangement structure" means the core arrangement structure at the time when it starts rotating about the center of the multicore unit, i.e., the core arrangement structure at a rotation angle of 0°, while the number by which the rotating core arrangement structure coincides with the unrotated core arrangement structure does not count the coincidence at the start of rotation.

In thus constructed multicore optical fiber, a plurality of core regions included in each multicore unit are arranged such that the cross-sectional structure of each multicore unit (the core arrangement structure defined on a cross section of the multicore optical fiber) has such a rotational symmetry as to coincide with the unrotated core arrangement structure at least three times. In other words, the core arrangement structure of each multicore unit has a rotational symmetry of 120° or less. Such a core arrangement structure reduces the structural asymmetry in each multicore unit, thereby lowering the structural birefringence. As a result, the polarization mode dispersion can effectively be inhibited from increasing in the multicore optical fiber.

The center of each multicore unit means the center of a predetermined core arrangement structure constructed by a plurality of core regions included in the multicore unit. That is, the center of each multicore unit is determined according to the outermost periphery of a figure formed by connecting the centers of the plurality of core regions with lines and specifically means the center or gravity center position of the figure defined by the outermost periphery.

In the multicore optical fiber according to the present invention, the plurality of core regions included in each multicore unit constitute a coupled core group. That is, adjacent core regions, among the plurality of core regions included in each multicore unit, are located close to each other or in contact with each other to such an extent as to induce mode coupling therebetween.

Preferably, in the multicore optical fiber according to the present invention, at least one pair of adjacent multicore units among the plurality of multicore units have the same core arrangement structure. In addition, it is also preferable that a core region included in one of the adjacent multicore units and a core region included in the other of the adjacent multicore units have refractive index distributions different from each other. This can reduce the mode coupling between the adjacent multicore units including the refractive index distributions different from each other, thereby effectively suppressing the crosstalk between the multicore units.

In the multicore optical fiber according to the present invention, at least one pair of adjacent multicore units among the plurality of multicore units may have core arrangement structures different from each other. This can also reduce the mode coupling between the adjacent multicore units, whereby the crosstalk suppressing effect can be obtained easily.

The multicore optical fiber according to the present invention may further comprise a leakage reducer arranged between at least one pair of adjacent multicore units among the plurality of multicore units. This can more effectively suppress the crosstalk between the adjacent multicore units.

DESCRIPTION OF THE PREFERRED EMBODIMENTS

Figure 1:
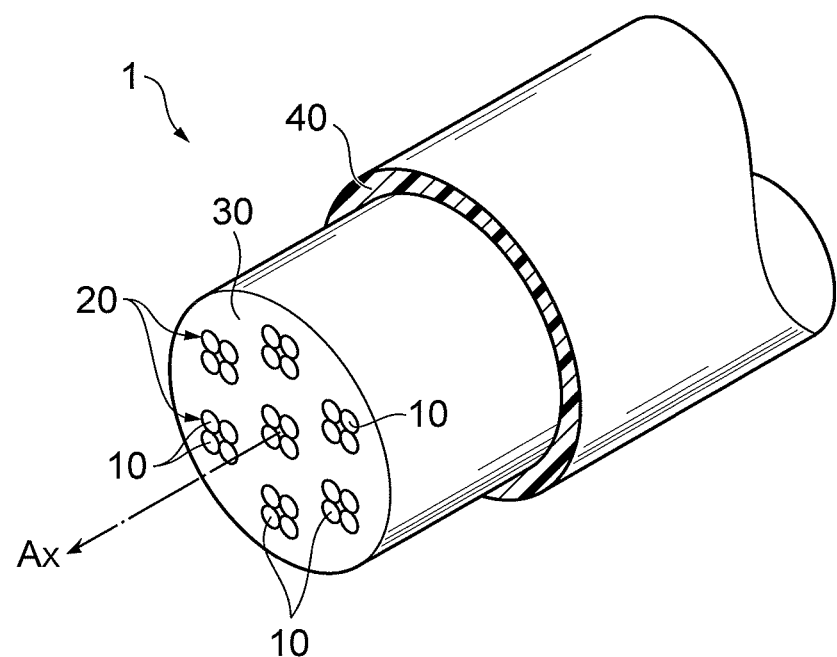
FIG. 1 is a view showing the structure of a first embodiment of the multicore optical fiber according to the present invention.

In the following, embodiments of the multicore optical fiber according to the present invention will be explained in detail with reference to FIGS. 1, 2A to 4B, 5, and 6. In the description of the drawings, identical or corresponding components are designated by the same reference numerals, and overlapping description is omitted.

First Embodiment

FIG. 1 is a view showing the structure of the first embodiment of the multicore optical fiber according to the present invention. As shown in FIG. 1, the multicore optical fiber 1 comprises a bare optical fiber including a plurality of multicore units each extending along an axis $A_X$ coinciding with the center of the multicore optical fiber 1 while being covered with a cladding region 30 thereabout and a resin coating 40 disposed at the outer periphery of the bare optical fiber. Each of the plurality of multicore units 20 has a plurality of core regions 10 arranged such as to construct a predetermined core arrangement structure on a cross section of the multicore optical fiber 1 orthogonal to the axis $A_X$. In the first embodiment, each multicore unit 20 is constituted by four core regions 10. A common cladding region may integrally cover the core regions 10, or cladding regions may be prepared for the respective core regions 10.

Figure 2A:
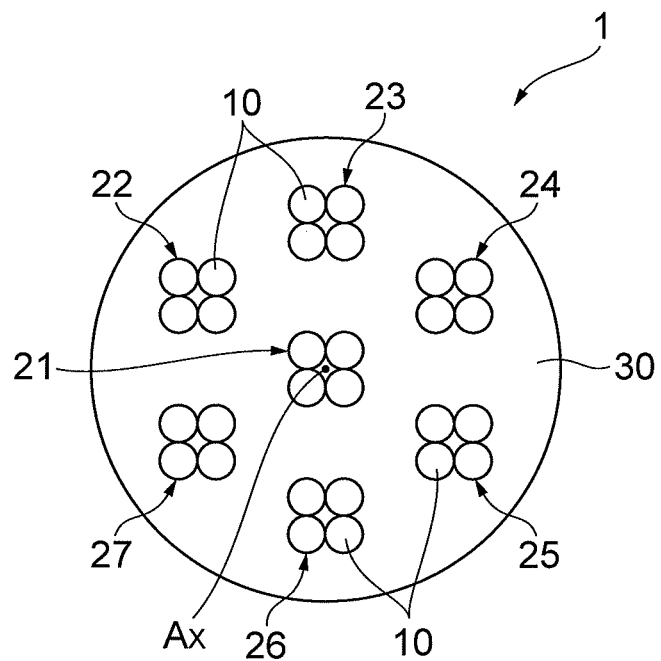
FIGS. 2A and 2B are views showing a cross-sectional structure of the multicore optical fiber according to the first embodiment shown in FIG. 1.
Figure 2B:
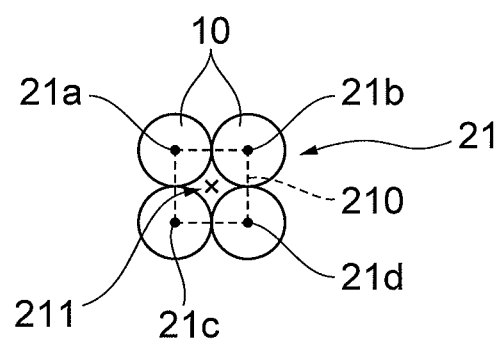

FIGS. 2A and 2B show the cross section orthogonal to the optical axis $A_X$ of the multicore optical fiber 1 shown in FIG. 1. As shown in FIG. 2A, multicore units 21 to 27 each comprising four core regions 10 and having the same core arrangement structure are arranged on the cross section orthogonal to the axis $A_X$ in the multicore optical fiber 1 according to the first embodiment. The multicore units 21 to 27 are arranged such that their centers are positioned on lattice points of a hexagonal lattice. The core arrangement structure (constituted by four core regions 10 included in each multicore unit) of each of the multicore units 21 to 27 has such a rotational symmetry as to coincide with the unrotated core arrangement structure four times while rotating by 360° about the center of its corresponding one of the multicore units 21 to 27 on the cross section orthogonal to the axis $A_X$. FIG. 2B shows the core arrangement structure of the multicore unit 21 as the core arrangement structure of each of the multicore units 21 to 27 in the present embodiment. For example, the multicore unit 21 has four core regions 10, while the center of the multicore unit 21 is determined by the outermost periphery 210 of a figure formed by connecting the respective centers 21a to 21d of the four core regions 10 with lines. Specifically, the center 211 (or gravity center position) of the figure defined by the outermost periphery 210 shown in FIG. 2B becomes the center of the multicore unit 21. The centers of the other multicore units 22 to 27 are determined as in the multicore unit 21 mentioned above. In the present embodiment, the center of the multicore unit 21 coincides with the axis $A_X$ of the multicore optical fiber 1. The four core regions 10 included in each of the multicore units 21 to 27 are arranged close to each other such that mode coupling occurs actively between the core regions 10, whereby a so-called coupling type multicore (coupled core group) is formed. The four core regions 10 constituting each of the multicore units 21 to 27 have the same refractive index distribution throughout all the multicore units 21 to 27.

In an example of the structure of the multicore optical fiber 1 according to the present embodiment, the bare optical fiber excluding the resin coating 40 in the multicore optical fiber 1 is a silica-based optical fiber having a diameter of 125 μm, in which the four core regions 10 constituting each of the multicore units 21 to 27 is doped with $GeO_2$ as a refractive index enhancer, while the cladding region 30 disposed at the outer periphery of the core region 10 is made of pure silica. In this case, each of the plurality of core regions 10 in the multicore optical fiber 1 has a core radius of 8.5 μm and a stepped refractive index profile. In the stepped refractive index profile, the relative refractive index difference between the core and cladding is 0.35%. The hexagonal lattice in which the centers of the multicore units 21 to 27 are arranged has a lattice spacing of 32 μm.

In the multicore optical fiber 1 according to the present embodiment, a group of core regions 10 constituting each of the plurality of multicore units 21 to 27 are arranged so that their core arrangement structure has such a rotational symmetry as to coincide with the unrotated core arrangement structure at least three times while rotating by 360° about the center of each multicore unit (the center 211 of FIG. 2B in the case of the multicore unit 21). This can reduce the structural asymmetry in each multicore unit, thereby lowering the structural birefringence. As a result, the polarization mode dispersion can effectively be inhibited from increasing in the multicore optical fiber 1.

Second Embodiment

Figure 3A:
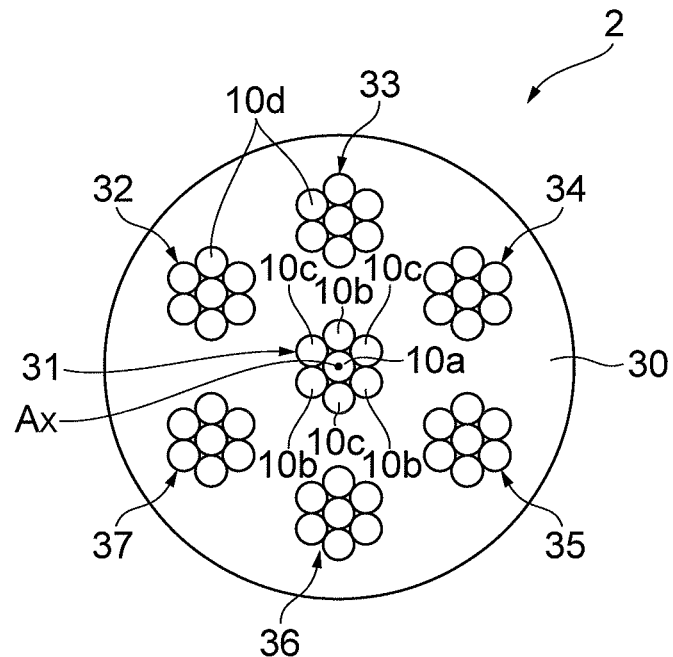
FIGS. 3A and 3B are views showing a cross-sectional structure in a second embodiment of the multicore optical fiber according to the present invention.
Figure 3B:
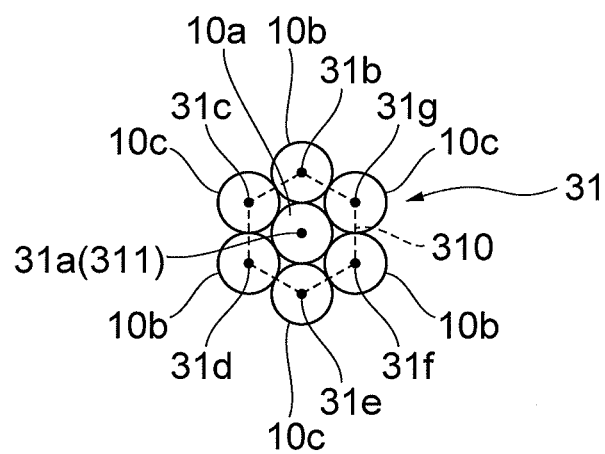

FIGS. 3A and 3B are views showing a cross-sectional structure in the second embodiment of the multicore optical fiber according to the present invention, in which FIG. 3A depicts only the bare optical fiber part excluding the resin coating. The cross section of FIG. 3A coincides with the cross section orthogonal to the axis $A_X$ in the multicore optical fiber 1 according to the first embodiment shown in FIG. 1.

The multicore optical fiber 2 according to the second embodiment shown in FIG. 3A differs from the multicore optical fiber 1 according to the first embodiment in the following points. Each of multicore units 31 to 37 included in the multicore optical fiber 2 is constituted by seven core regions 10 (10a to 10d). At least one pair of adjacent multicore units among the multicore units 31 to 37 have the same core arrangement structure (the arrangement of core regions included in each multicore unit defined on the cross section of FIG. 3A). The refractive index distribution of each core region included in one of the adjacent multicore units and the refractive index distribution of each core region included in the other of the adjacent multicore units differ from each other. The structure of the multicore optical fiber 2 according to the second embodiment will now be explained specifically.

As shown in FIG. 3A, the multicore units 31 to 37 are arranged on the cross section orthogonal to the axis $A_X$ in the multicore optical fiber 2. The multicore units 31 to 37, each of which is constituted by seven core regions 10 (10a to 10d), have the same core arrangement structure (the arrangement of core regions 10 included in each multicore unit). The multicore units 31 to 37 are arranged such that their centers are positioned on lattice points of a hexagonal lattice. The seven core regions 10 included in each of the multicore units 31 to 37 are arranged close to each other such that mode coupling occurs actively between the core regions 10, whereby a so-called coupling type multicore (coupled core group) is formed.

In the cross section orthogonal to the axis $A_X$ in the multicore unit 31 in the multicore units 31 to 37, one core region 10a is arranged at the center of the multicore unit 31 (the center of the core region 10a and the center of the multicore unit 31 coincide with each other), while two kinds of core regions 10b, 10c having respective refractive index distributions different from each other, each differing from the refractive index distribution of the core region 10a, are arranged alternately such as to surround the core region 10a. In each of the multicore units 32 to 37, on the other hand, the core regions 10d having the same refractive index distribution are arranged such that six core regions 10d surround one core region 10d on the cross section orthogonal to the axis $A_X$ as in the multicore unit 31. As a result, in each of the multicore units 31 to 37, the core regions 10 constituting the same are arranged so that their core arrangement structure has such a rotational symmetry as to coincide with the unrotated core arrangement structure six times while rotating by 360° about the center of each multicore unit.

FIG. 3B shows the core arrangement structure of the multicore unit 31 as the core arrangement structure of each of the multicore units 31 to 37 in the present embodiment. For example, the multicore unit 31 has seven core regions 10a to 10c (three kinds), while the center of the multicore unit 31 is determined according to the outermost periphery 310 of the figure formed by connecting the respective centers 31a to 31g of the seven core regions with lines. Specifically, the center 311 (or gravity center position) of the figure defined by the outermost periphery 310 shown in FIG. 3B becomes the center of the multicore unit 31. The centers of the other multicore units 32 to 37 are determined as in the multicore unit 31 mentioned above. In the present embodiment, the center 311 of the multicore unit 31 coincides with not only the center 31a of the core region 10a surrounded by the six core regions 10b, 10c (two kinds), but also the axis $A_X$ of the multicore optical fiber 1.

The following is an example of the structure of the multicore optical fiber 2 according to the present embodiment in the case where the bare optical fiber excluding the resin coating 40 in the multicore optical fiber 2 has a diameter of 125 μm. Each of the core regions 10a to 10d has a core radius of 8.5 μm and a stepped refractive index profile. The relative refractive index difference between the core and cladding is 0.1%, 0.2%, 0.3%, and 0.35% in the core regions 10a, 10b, 10c, and 10d, respectively. The multicore units 31 to 37 are arranged such that their centers construct a hexagonal lattice with a lattice spacing of 40 μm. In the core regions included in the structure mentioned above, the core regions 10a, 10b having the relative refractive index differences of 0.1% and 0.2%, respectively, included in the multicore unit 31 may yield transmission losses different from those of the other core regions 10c, 10d. However, the core regions 10a, 10b may be left unused in actual communications, so that the core regions used in the actual communications can yield similar transmission losses.

The following is another example of the structure of a plurality of core regions 10a to 10d in the multicore optical fiber 2 according to the present embodiment. Each of the core regions 10a to 10d has a core radius of 7.5 μm and a stepped refractive index profile. The relative refractive index difference between the core and cladding is 0%, −0.1%, 0.45%, and 0.45% in the core regions 10a, 10b, 10c, and 10d, respectively. The multicore units 31 to 37 are arranged such that their centers construct a hexagonal lattice with a lattice spacing of 40 μm.

Mode coupling and crosstalk can be reduced in the structure where at least one pair of adjacent multicore units in a plurality of multicore units 31 to 37 have the same core arrangement structure but different refractive index distributions in the core regions, i.e., between the multicore units having core regions with different refractive index distributions (between the multicore unit 31 and any of the multicore units 32 to 37 in the present embodiment) as in the multicore optical fiber 2 according to the present embodiment.

Third Embodiment

Figure 4A:
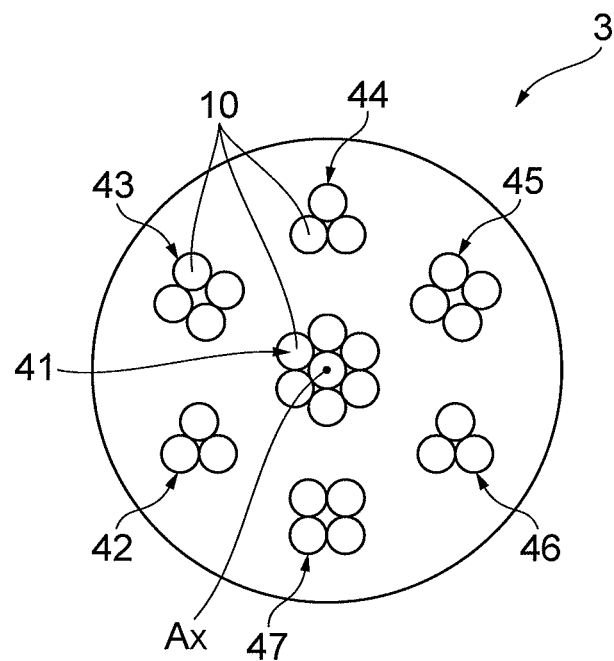
FIGS. 4A and 4B are views showing a cross-sectional structure in a third embodiment of the multicore optical fiber according to the present invention.
Figure 4B:
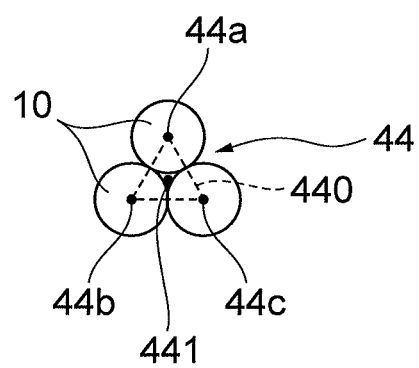

FIGS. 4A and 4B are views showing a cross-sectional structure in the third embodiment of the multicore optical fiber according to the present invention, in which FIG. 4A depicts only the bare optical fiber part excluding the resin coating. The cross section of FIG. 4A coincides with the cross section orthogonal to the axis $A_X$ in the multicore optical fiber 1 according to the first embodiment shown in FIG. 1.

The multicore optical fiber 3 according to the third embodiment shown in FIG. 4A differs from the multicore optical fiber 1 according to the first embodiment in the following point. That is, the multicore units 41 to 47 included in the multicore optical fiber 3 according to the third embodiment have core arrangement structures different from each other.

As shown in FIG. 4A, the multicore optical fiber 3 according to the third embodiment is provided with seven multicore units 41 to 47 having their centers located at lattice points of a hexagonal lattice. In particular, the multicore unit 41 constituted by seven core regions 10 is arranged at the lattice point in the center part of the hexagonal lattice, i.e., the center of the multicore optical fiber 3. In the multicore unit 41, one core region 10 is arranged at the center of the multicore unit 41 and surrounded by six core regions 10. The multicore units 42, 44, 46 each constituted by three core regions 10 and the multicore units 43, 45, 47 each constituted by four core regions 10 are arranged alternately on the lattice points in the outer peripheral part of the hexagonal lattice. The core regions 10 constituting the multicore unit 41 are arranged so that their core arrangement structure has such a rotational symmetry as to coincide with the unrotated core arrangement structure six times while rotating by 360° about the center of the multicore unit 41 in the cross section orthogonal to the axis $A_X$. The core regions 10 constituting the multicore units 42, 44, 46 are arranged so that their core arrangement structure has such a rotational symmetry as to coincide with the unrotated core arrangement structure three times while rotating by 360° about their corresponding centers of the multicore units 42, 44, 46 in the cross section orthogonal to the axis $A_X$. The core regions 10 constituting the multicore units 43, 45, 47 are arranged so that their core arrangement structure has such a rotational symmetry as to coincide with the unrotated core arrangement structure four times while rotating by 360° about their corresponding centers of the multicore units 43, 45, 47 on the cross section orthogonal to the axis $A_X$. The core regions 10 included in each of the multicore units 41 to 47 are arranged close to each other such that mode coupling occurs actively between the core regions 10 constituting the same multicore unit, whereby a so-called coupling type multicore (coupled core group) is formed. The core regions 10 constituting each of the multicore units 41 to 47 have the same refractive index distribution throughout all the multicore units 41 to 47.

The center of the multicore unit 41 is determined as in the multicore unit 31 shown in FIG. 3B. The centers of the multicore units 43, 45, 47 are determined as in the multicore unit 21 shown in FIG. 2B. Therefore, FIG. 4B shows the core arrangement structure of the multicore unit 44 as the core arrangement structure of each of the multicore units 42, 44, 46. For example, the multicore unit 44 has three core regions 10, while the center of the multicore unit 44 is determined according to the outermost periphery 440 of the figure formed by connecting the respective centers 44a to 44c of the three core regions 10 with lines. In particular, the center 441 (or gravity center position) of the figure defined by the outermost periphery 440 shown in FIG. 4B becomes the center of the multicore unit 44.

The following is an example of the structure of the multicore optical fiber 3 according to the third embodiment in the case where the bare optical fiber excluding the resin coating 40 in the multicore optical fiber 3 has a diameter of 125 μm. Each of the core regions 10 has a core radius of 8.5 μm and a stepped refractive index profile. In the stepped refractive index profile, the relative refractive index difference between the core and cladding is 0.35%. The multicore units 41 to 47 are arranged such that their centers construct a hexagonal lattice with a lattice spacing of 36 μm.

Thus, the multicore optical fiber 3 according to the third embodiment employs a structure in which at least one pair of adjacent multicore units among the multicore units 41 to 47 have core arrangement structures different from each other. This can reduce both mode coupling and crosstalk between adjacent multicore units having core arrangement structures different from each other. The multicore optical fiber 3 according to the third embodiment is effective in that it can further reduce the crosstalk without changing refractive index distributions of core regions 10 included in the multicore units 41 to 47.

The following is another example of the structure of the multicore optical fiber 3 according to the third embodiment in the case where the bare optical fiber excluding the resin coating 40 in the multicore optical fiber 3 has a diameter of 125 μm. Each of the core regions 10 has a core radius of 8.5 μm and a stepped refractive index profile. In the stepped refractive index profile, the relative refractive index difference between the core and cladding is 0.35%. The multicore units 41 to 47 arranged such that their centers construct a hexagonal lattice can employ a structure in which a trench having a relative refractive index difference of −0.3% and a thickness of 5 μm is provided on the outer side. Providing the trench as such can further reduce the crosstalk between the multicore units while lowering the bending loss.

Fourth Embodiment

Figure 5:
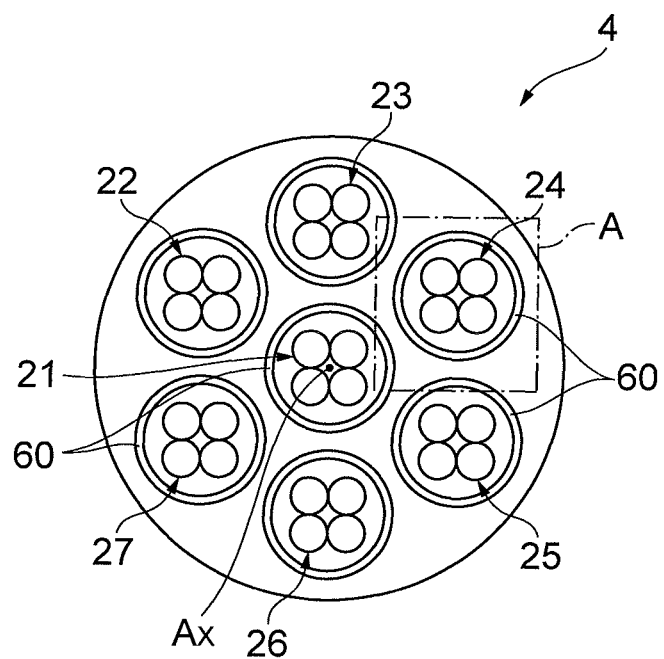
FIG. 5 is a view showing a cross-sectional structure in a fourth embodiment of the multicore optical fiber according to the present invention.

FIG. 5 is a view showing a cross-sectional structure in the fourth embodiment of the multicore optical fiber according to the present invention and depicts only the bare optical fiber part excluding the resin coating. The cross section of FIG. 5 coincides with the cross section orthogonal to the axis $A_X$ in the multicore optical fiber 1 according to the first embodiment shown in FIG. 1.

The multicore optical fiber 4 according to the fourth embodiment shown in FIG. 5 differs from the multicore optical fiber 1 according to the first embodiment in the following point. That is, ring-shaped leakage reducers 60 surround the multicore units 21 to 27, respectively, in the multicore optical fiber 4 according to the fourth embodiment.

As shown in FIG. 5, the multicore optical fiber 4 according to the fourth embodiment is provided with seven multicore units 21 to 27. Each of the even multicore units 21 to 27 is constituted by four core regions 10. In particular, the core regions 10 constituting the multicore units 21 to 27 are arranged so that their core arrangement structure has such a rotational symmetry as to coincide with the unrotated core arrangement structure four times while rotating by 360° about the respective centers of the multicore units 21 to 27 on the cross section orthogonal to the axis $A_X$. The multicore units 21 to 27 have a core arrangement structure similar to that of the first embodiment (FIG. 2A), while their respective centers are determined as shown in FIG. 2B. The four core regions 10 included in each of the multicore units 21 to 27 are arranged close to each other such that mode coupling occurs actively between the core regions 10, whereby a so-called coupling type multicore (coupled core group) is formed. The four core regions 10 constituting each of the multicore units 21 to 27 have the same refractive index distribution throughout all the multicore units 21 to 27. This is the same as in the multicore optical fiber 1 according to the first embodiment. The leakage reducers 60 surround the multicore units 21 to 27, respectively.

Figure 6:
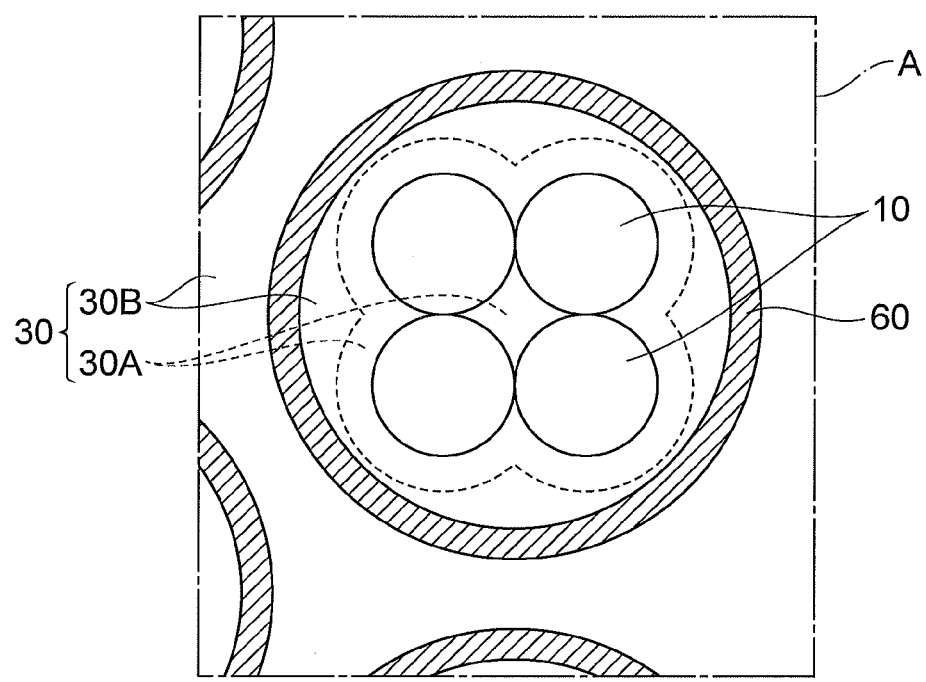
FIG. 6 is a view enlarging a part of the cross section in the multicore optical fiber according to the fourth embodiment shown in FIG. 5.

The leakage reducers 60 will now be explained with reference to FIG. 6. FIG. 6, which is a view for explaining the structure and function of the leakage reducers together with a leak light reduction mechanism, corresponds to an area A (an area of the multicore optical fiber 4 on the cross section orthogonal to the axis $A_X$) shown in FIG. 5.

As shown in FIG. 6, the ring-shaped leakage reducers 60 are prepared for the multicore units 21 to 27, respectively. The leakage reducers 60 surround the respective core regions 10 constituting the multicore units 21 to 27 and a part of the cladding region 30 covering the peripheries of the core regions 10. More specifically, the cladding region 30 is constituted by optical claddings 30A provided, as areas influencing the transmission characteristic of light propagating through the core regions 10, at the outer peripheries of the core regions 10 and in the center areas surrounded by the core regions 10 and a physical cladding 30B provided, as an area not influencing the transmission characteristic of light propagating through the core regions 10, on the outer peripheries of the optical claddings 30A. More preferably, the leakage reducers 60 are formed within the physical cladding 30B in order to prevent the core regions 10 from deteriorating their respective transmission performances. The optical and physical claddings 30A, 30B are regions which can be distinguished functionally according to whether or not they influence the transmission characteristic, but not structurally by their compositions and the like. Hence, the boundary between the optical and physical claddings 30A, 30B constituting the cladding region 30 is depicted with a broken curve in FIG. 6 for convenience in order to facilitate the understanding of the present invention.

As shown in FIG. 6, each of the leakage reducers 60 is an area for reducing the power of leak light from the core region 10 and functions to effectively lower the quantity of leak light by optical control such as absorption, scattering, and confinement. In the cross section of the multicore optical fiber 4 orthogonal to the axis $A_X$, the leakage reducer 60 is disposed between where the distance from the center of the multicore unit (coinciding with the center of the core arrangement structure constituted by the four core regions 10) is 5/2 times the MFD at a wavelength of 1.55 μm assuming that the core regions 10 exist alone and the outer periphery of the cladding region 30 (the interface between the physical cladding and the resin coating). Alternatively, the leakage reducer 60 may be disposed between where the electric field amplitude of a multicore unit constituted by a plurality of core regions 10 is $10^{-4}$ or less of its peak value and the outer periphery of the multicore optical fiber 4.

The following is an example of the structure of the multicore optical fiber 4 according to the fourth embodiment. The bare optical fiber excluding the resin coating 40 in the multicore optical fiber 4 is a silica-based optical fiber having a diameter of 125 μm. The four core regions 10 constituting each of the multicore units 21 to 27 is doped with $GeO_2$ as a refractive index enhancer, while the cladding region 20 disposed at the outer periphery of the core region 10 is made of pure silica. In this case, each of the plurality of core regions 10 in the multicore optical fiber 4 has a core radius of 8.5 μm and a stepped refractive index profile. In each of the plurality of core regions 10, the relative refractive index difference between the core and cladding is 0.35%. The multicore units 21 to 27 are arranged such that their centers construct a hexagonal lattice with a lattice spacing of 32 μm. Each of the leakage reducers 60 surrounding the multicore units 21 to 27, respectively, has a relative refractive index difference of −0.5% and a thickness of 5 μm.

Thus, the multicore optical fiber 4 according to the fourth embodiment is provided with the leakage reducers 60 surrounding the respective multicore units 21 to 27. Such a structure in which the leakage reducers 60 exist between the adjacent multicore units 21 to 27 can reduce the crosstalk therebetween.

It is not necessary for the leakage reducers 60 to surround the multicore units 21 to 27. Arranging the leakage reducer 60 on a line connecting the centers of the core regions 10 included in adjacent multicore units can also reduce the crosstalk between the adjacent multicore units.

Though embodiments of the present invention have been explained in the foregoing, the present invention can be modified in various ways without being restricted to the above-mentioned embodiments.

For example, while the change in core arrangement structures included in the multicore units and the change in the refractive index distribution of core regions are explained in separate embodiments, they may be combined together.

As described above, in accordance with the present invention, the increasing of polarization mode dispersion can be effectively inhibited.

What is claimed is:

1. A multicore optical fiber, comprising:
a plurality of multicore units each extending along an axis and having a plurality of core regions, the plurality of core regions included in each of the plurality of multicore units being arranged such as to construct a predetermined core arrangement structure on a cross section of the multicore optical fiber orthogonal to the axis; and
a cladding region covering the plurality of multicore units while separating the multicore units from each other;
wherein the core arrangement structure of each of the plurality of multicore units has such a rotational symmetry as to coincide with the unrotated core arrangement structure at least three times while rotating by 360° about a center of the multicore unit.

2. The multicore optical fiber according to claim 1, wherein adjacent core regions, among the plurality of core regions included in each of the plurality of multicore units, are located close to each other or in contact with each other to such an extent as to induce mode coupling therebetween.

3. The multicore optical fiber according to claim 2, further comprising a leakage reducer arranged between at least one pair of adjacent multicore units among the plurality of multicore units.

4. The multicore optical fiber according to claim 1, wherein at least one pair of adjacent multicore units, among the plurality of multicore units, have the same core arrangement structure, and a core region included in one of the adjacent multicore units and a core region included in the other of the adjacent multicore units have refractive index distributions different from each other.

5. The multicore optical fiber according to claim 1, wherein at least one pair of adjacent multicore units, among the plurality of multicore units, have core arrangement structures different from each other.

6. The multicore optical fiber according to claim 1, further comprising a leakage reducer arranged between at least one pair of adjacent multicore units among the plurality of multicore units.

7. The multicore optical fiber according to claim 1, wherein each of the plurality of multicore units constitutes a coupling type multicore.

8. The multicore optical fiber according to claim 7, further comprising a leakage reducer arranged between at least one pair of adjacent multicore units among the plurality of multicore units.

* * * * *